United States Patent [19]

Camerini et al.

[11] 4,394,104

[45] Jul. 19, 1983

[54] CONTAINER STORAGE INSTALLATION

[76] Inventors: Mario Camerini, Via Puntoni 5; Giacomo Pizzi, Piazza Cavour 22, both of Livorno, Italy

[21] Appl. No.: 169,245

[22] Filed: Jul. 16, 1980

[30] Foreign Application Priority Data

Jul. 16, 1979 [IT] Italy ............................ 17408 A/79

[51] Int. Cl.³ .............................................. B65G 1/06
[52] U.S. Cl. .................................... 414/276; 414/280; 414/621
[58] Field of Search ............... 414/276, 280, 282, 286, 414/621, 661

[56] References Cited

U.S. PATENT DOCUMENTS

| | | | |
|---|---|---|---|
| 2,629,507 | 2/1953 | Olson | 414/621 |
| 3,455,469 | 7/1969 | Evans | 414/280 |
| 3,559,822 | 2/1971 | Lichtenford et al. | 414/139 |
| 3,674,159 | 7/1972 | Lemelson | 414/276 |
| 3,782,565 | 1/1974 | Doran et al. | 414/277 |

FOREIGN PATENT DOCUMENTS 1382712 2/1975 United Kingdom ............... 414/621

Primary Examiner—Trygve M. Blix
Assistant Examiner—Stephen P. Avila
Attorney, Agent, or Firm—Sughrue, Mion, Zinn, Macpeak, and Seas

[57] ABSTRACT

The installation is of the type comprising a warehouse providing rows and columns of container-receiving cells opening at one end into a passageway accommodating a horizontally and vertically displaceable loading- and unloading unit. The floor section of each cell comprises a pair of longitudinal rails (4) inclined towards the passageway at a slope of 2-4%. The container (C) is handled by devices engaging its four lower corner blocks (18) so as to minimize the effects of stresses on the container structure during handling and storage. One end of the container is deposited onto a trolly (31) freely rolling on the rails. The other end is manoeuvred by a power-actuated carriage (14) rolling on an elevator platform (5) and is deposited onto supports (30) projecting upwardly from the lower end portions of the rails. (FIG. 4).

7 Claims, 11 Drawing Figures

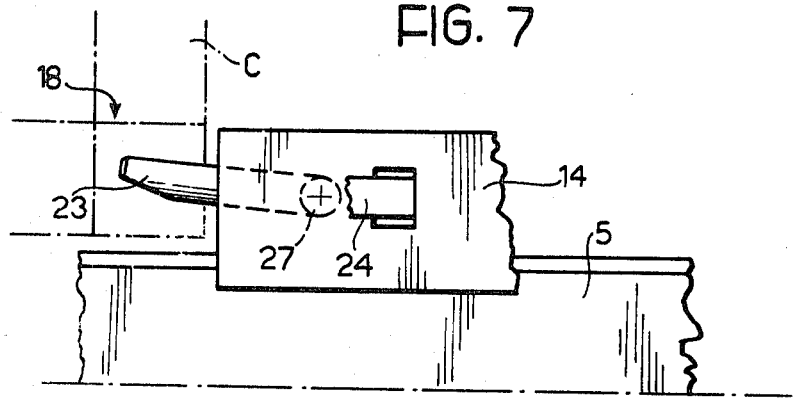
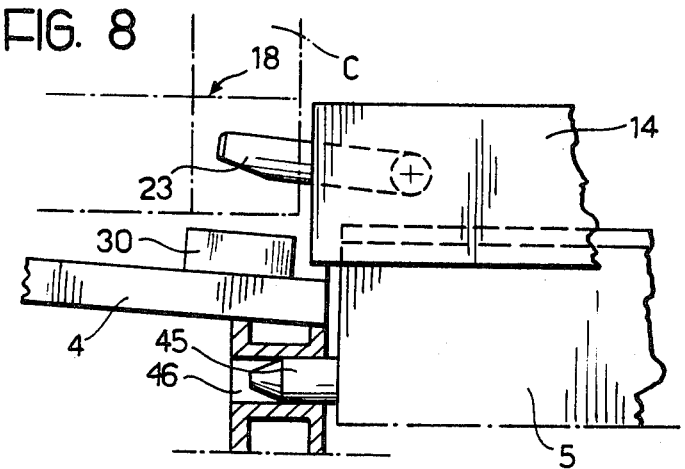
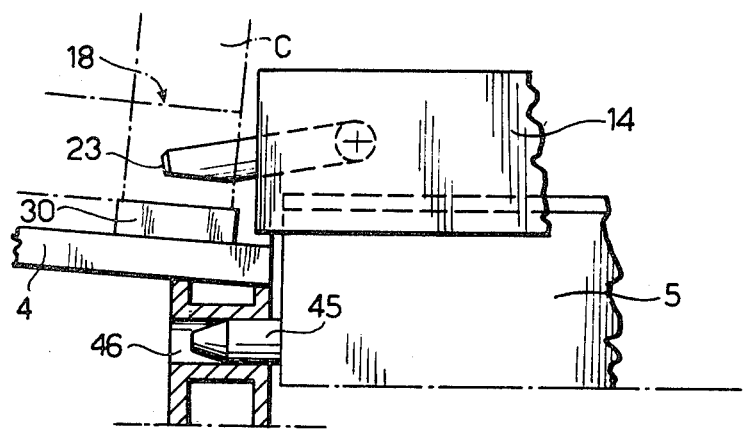

CONTAINER STORAGE INSTALLATION

The present invention relates to freight container traffic.

More particularly, the invention relates to an improvement in a container storage installation comprising: a warehouse having a plurality of elongated, container-receiving cells arranged in an array of rows and columns, a servicing passageway common to said cells and into which each cell opens by one end, and a container loading- and unloading unit displaceable horizontally and vertically in the said passageway for loading and unloading a container lengthwise into and from a selected cell, each cell having floor members supporting a container in the cell, and wherein the container comprises a standard corner block at each of its four lower corners.

An installation of the type just specified above is disclosed by U.S. Pat. No. 3,559,822 and its corresponding British Pat. No. 1,214,618.

According to the art, the loading- and unloading unit comprises means grasping a container by its four upper corners and arranged to be slid longitudinally into a receiver appliance provided in each cell in the "ceiling" region of the latter whereupon the container is lowered to rest on the floor members of the cell and its grasping means are retracted to the loading/unloading unit.

A first disadvantage of such system is that a substantial additional overhead space is necessary in each cell to accomodate the said receiver appliance and to allow for operational displacements of the grasping means during loading and unloading. Such space represents for each cell an additional height averaging between 1 and 1.5 meters making a total height of each cell of from 4 to 4.5 meters. Thus, for example, to accommodate 10 superposed rows of cells a warehouse is necessary of a height as great as 40-45 meters representing roughly 170% of the combined height of the containers storable in a column of cells. This circumstance involves both a poor exploitation of vertical space and high costs of investment and consumed power. Also, the abovementioned receiving appliance in each cell requires additional heavy girders or rails, capable of temporarily supporting a container together with its grasping means, and this requirement involves a substantial additional weight to be taken into account in designing the framework of the warehouse. Obviously, the investment cost increases correspondingly. A still another disadvantage of the abovementioned system resides in that, with the container grasped by its four upper corners, the kind and distribution of stresses in the structure of the container are extremely unfavourable. It is not unfrequent, in transfering a container from the shore onto a ship or vice-versa, that the container grasped by its upper corners breaks-up into two halves and its contained freight precipitates onto the shore, onto the ship or into the sea. Even if it may be admitted that such incident is not critically detrimental to the progress of the transfer operations in course, nevertheless it must be recognized that a similar incident in a container storage installation may cause serious damages and, any way, would interrupt for a substantial time the operation of the installation due to the freight and broken container fragments disseminated in the cells and in the passageway. The probability of such events increases with time, mainly because of the increasing age of the containers in use and lesions produced by brutal handling.

There is also a further factor, which does not appear to have been carefully considered to date and resides in deflection of a container (especially of ISO designation 1A and 1AA, of a length as great as 40 ft=12.190 m) when the container is suspended or supported by its ends. Under such conditions the container bows towards the ground. At the other hand, when the container is deposited onto a planar surface, or onto cross beams located intermediate the ends of the container, the latter straightens out at least partially due to drastic modification of the stress/strain pattern. To not adversely affect the strength and life of the container it would be desirable to preserve (at least in a container storage installation) the naturally bowed condition of the container.

It is a main object of this invention to avoid, or drastically reduce the disadvantages mentioned hereinbefore and, at the same time, to attain the lastmentioned desirable condition. Further objects and advantages of the invention will be apparent from the following description.

In accordance with the above, and in a container storage installation as defined hereinbefore, the invention resides in an improvement wherein:

- the floor members in each cell comprise a pair of transversely spaced guide rails extending longitudinally of the cell throughout substantially the whole length of the latter, and a trolly bridging the rails and having a container-supporting upper surface providing a support for a restricted end-region only of the container corresponding substantially to the lower corner blocks at that end, said trolly being freely rollable on the rails under a thrust applied thereto by a container during loading and unloading into and from the cell;
- the loading- and unloading unit comprises a horizontally elongated platform capable of supporting a container on its upper face, and a carriage displaceable on said face from one end to the other end of the platform, said carriage comprising means capable of engaging a container on the platform by an end pair of the corner blocks of the container to push and pull the latter lengthwise thereof for respectively loading and unloading the cell;
- the rails in each cell are sloping towards the passageway whereby, as the leading end of a container being pushed into a cell takes its support on the trolly, the latter is entrained by the container to climb along the rails thereby to gradually lift the said leading end of the container.

In practice, the slope of the rails is very small, generally from 2% to 4%, and serves to avoid friction contacts between the bottom surface of the container (which is bowed downwardly) and underlying parts of the installation. With such a small slope the rails need not be added to the framework of the warehouse but, rather, are identical with the girders of the framework flanking the bottom region of the cell and purposely sloping as indicated above, that is, inclined by an angle of from about 1° to about 3° to the horizontal. Moreover, under the conditions indicated above, the weight and bulk of the trolly may be kept very small. More particularly, the height of the trolly may amount to about 25-30 cm only and, therefore, is uncomparably less than the overhead dead space of 1-1.5 meters required by the prior art. The displacement of the trolly on the rails is produced by the container; that is to say, no motor and speed-reducing gearing are necessary on the trolly. Also, the container is supported by its lower corner blocks only, which are the strongest points of the container framework, and preserves its bowed configuration.

According to an advantageous embodiment, the means on the carriage capable of engaging the container comprise a pair of bolts protruding longitudinally from a front face of the carriage for engagement into the front eyes (as will be better seen hereinafter) in corresponding end corner blocks of the container. Also, advantageously, the bolts are power-actuated for displacement in their vertical planes thereby to provide means capable of lifting with respect to the platform the container end in which the bolts are engaged. The lifting displacement serves to detach the involved end of the container from the platform and, therefore, its extent in practice is very small. Still according to an advantageous embodiment of the invention, the said means on the carriage capable of engaging the container further comprise a pair of lateral jaws closable on the respective corner blocks in embrace therebetween the respective end portion of the container, each of the jaws comprising a tooth engaging into the lateral eye of the respective corner block on closure of the jaw whereby the carriage may push and pull the container.

In the appended drawings:

FIGS. 7, 8 and 9 are lateral views similar to that of FIG. 5 showing the carriage in three stages of its operation;

Figure 1:
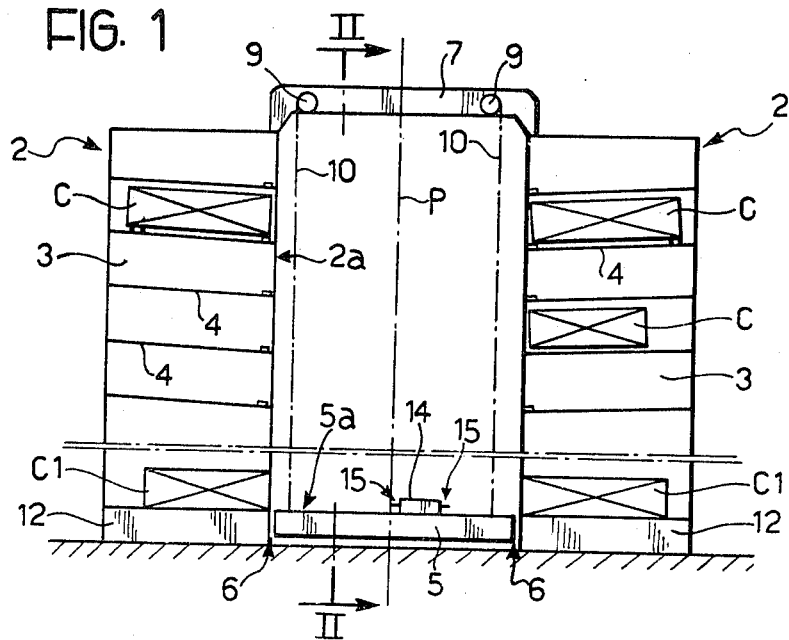
FIG. 1 is a schematic elevational end-view of a container storage installation according to this invention.
Figure 2:
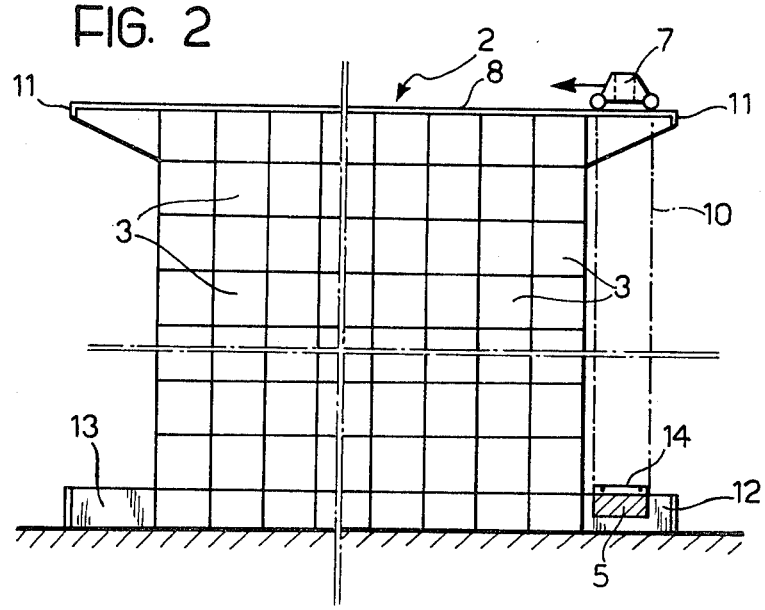
FIG. 2 is a longitudinal cross-sectional view on line II—II of FIG. 1.
Figure 10:
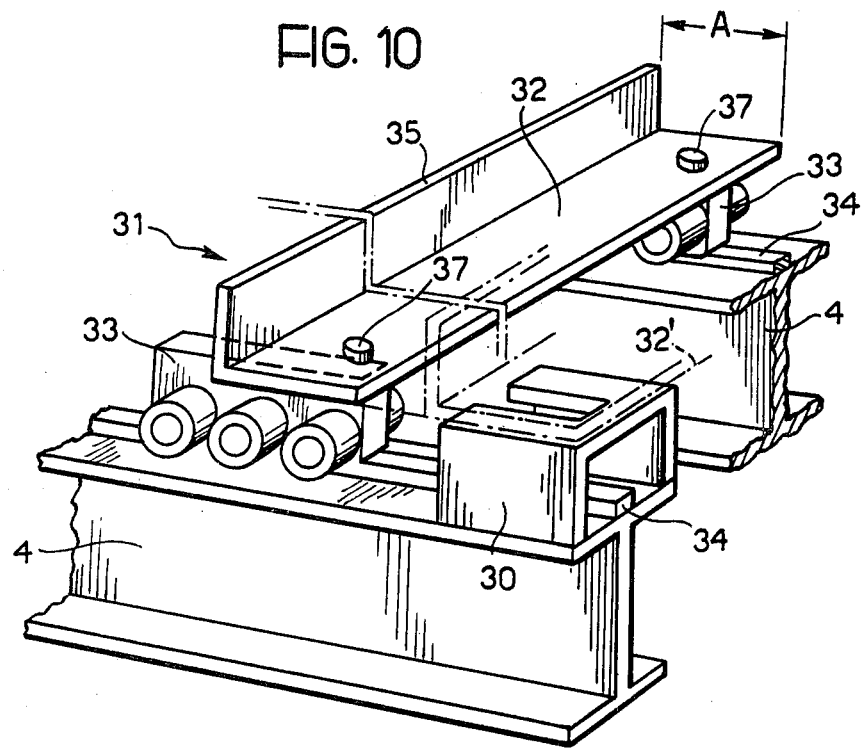
FIG. 10 is a perspective view showing the trolly on its two guide rails in a cell.

The storage installation as shown in FIGS. 1 and 2 comprises a passageway 1 directed perpendicularly to the plane of FIG. 1 between a pair of parallelepipedic warehouses 2 symmetrical with respect to a longitudinal vertical mid-plane P. Each of the warehouses 2 essentially consists of a steel framework forming rows and columns of container-receiving cells 3, the containers being denoted by C. Each cell is elongated perpendicularly to the length of the passageway 1 and opens into the latter by its one end. The floor part of each cell is defined by a pair of transversely spaced girders 4 (see also FIG. 10), which are mutually parallel and belong to the framework of the respective warehouse 2. The vertical faces, through which the cells open into the passageway 1, of the warehouses 2 are denoted by 2a.

The passageway 1 accommodates an elevator platform 5 of a box-like construction, elongated transversely of the passageway 1 and capable of receiving a container on its upper face 5a. The ends of the platform 5 form with the faces 2a of the respective warehouses 2 clearances 6 as small as practically possible and the platform is displaceable vertically and along the passageway 1 by any suitable means. In the example illustrated, said means comprise a travelling crane 7 bridging the warehouses 2 and rolling on rails 8 on the roofs of the warehouses along the passageway 1. The crane is equipped with winches 9 for vertically translating the platform 5 by means of cables or chains 10 attached to the four corner regions of the platform, as is known per se. The rails 8 protrude beyond the opposite ends of the warehouses 2 and the protruding sections are supported by brackets 11 of the framework of the warehouses. Thus, the platform 5 may be translated by the crane 7 beyond the ends of the warehouses and positioned between a pair of ground-supported transit platforms 12 at one end of the installation or between a similar pair of transit platforms 13 at the other end of the installation. In operation, a container such as C1 (FIG. 1) to be stored in the installation is deposited by conventional means onto one of the transit platforms 12 (which may also be equipped with weighing means for the container) and at a convenient moment is transferred onto the elevator platform 5 for loading into a selected cell. Whereas a container unloaded from a cell by means of the elevator platform 5 may be transferred onto one of the transit platforms 13 at the other end of the installation for loading onto a transport vehicle or ship. This traffic through the installation may advantageously be controlled by a computer. Reference 14 denotes a carriage displaceable on the upper face of the elevator platform 5 throughout the whole length of the latter, the carriage being equipped at each of its front sections with means generically indicated by 15 in FIGS. 1 and 4, for engaging a container by an end pair of the lower corner blocks thereby to selectively push or pull the container lengthwise. Thus, in the position of platform 5 shown in FIGS. 1 and 2, either one of the containers C1 on the transit platforms 12 may be engaged by the carriage 14 and pulled onto the elevator platform 5, whereupon the latter reaches a designated empty cell 3 and the carriage 14 pushes the container from the platform 5 into the cell. Similarly, for unloading a cell, the carriage 14 pulls the container from the cell onto the platform 5 and, when the latter reaches the pair of transit platforms 13, pushes the container onto the respective transit platform. The push- and pull displacement of the carriage are produced by a power system enclosed by the elevator platform 5. According to FIG. 4, the system may comprise an endless chain 16 entrained by an electric motor 17 and having the carriage 14 attached to a longitudinally extending upper run of the chain.

Figure 3:
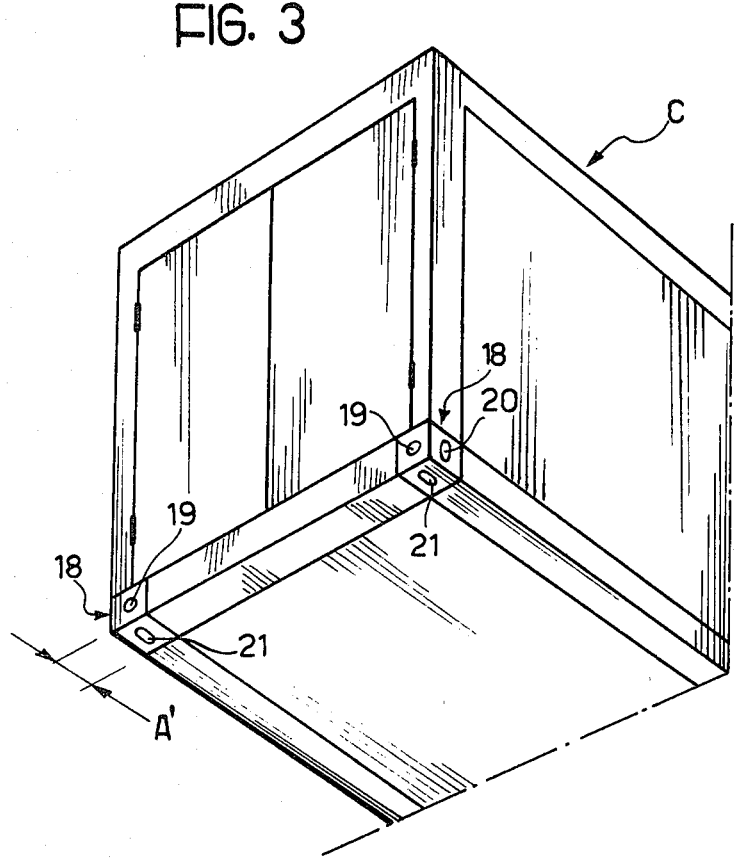
FIG. 3 is a perspective view, obliquely from below, of an end section of a container showing the lower corner blocks involved by this invention.

For the sake of clarity, FIG. 3 shows details of a container which are relevant to this invention. More particularly, each end of the container comprises a pair of "standard" lower corner blocks 18 and the invention relies upon these blocks because they constitute the most strong and safe points for handling the container. Usually, the container will also comprise top corner blocks (not shown), but their presence is not relevant here. The design of the blocks is subject to internationally recognized regulations, such as American National Standard MH5.4-1972, and each block comprises a front eye 19, a lateral eye 20 and a bottom eye 21, the positions of which in the geometry of the container are also fixed by the standard regulations. For example, the centers of the front eyes 19 are mutually spaced by 7 ft (2259 mm) and each of them is spaced from the respective vertical corner of the block by $3\frac{1}{2}$ inches (89 mm).

Figure 5:
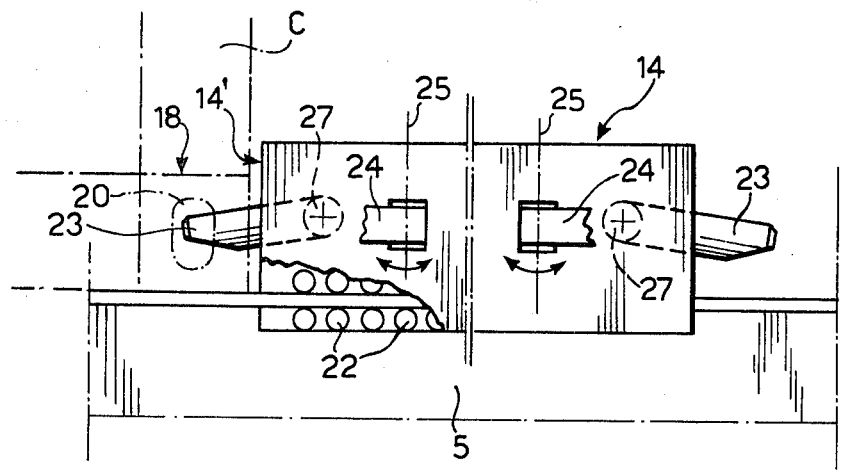
FIG. 5 is a schematic lateral view of the carriage on the platform.
Figure 6:
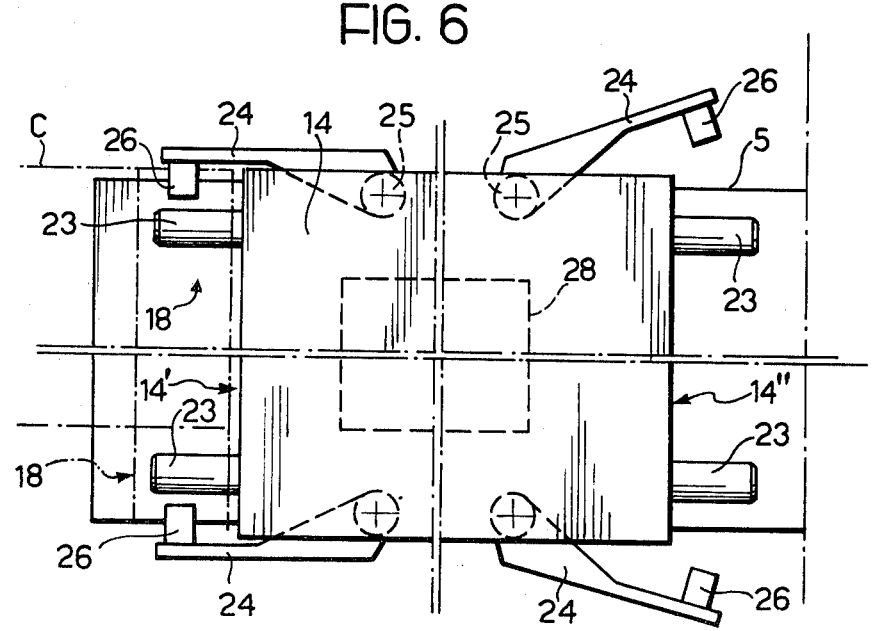
FIG. 6 is the corresponding plan view.

According to FIGS. 5 and 6, the carriage 14 is guided on the platform 5 by means of sets of rolls 22 preventing any sort of tilting or skewing. From each of the two end faces 14', 14" of the carriage protrudes longitudinally of the platform a pair of bolts 23 at locations corresponding to the front eyes 19 of the end pair of corner blocks 18, and it may be recognized from FIGS. 5 and 6 that the bolts pertaining to the face 14' of the carriage are slid into the front eyes of the corner blocks 18 of a container C. Also, associated with each pair of bolts 23 is a pair of lateral jaws 24 pivoted to the carriage on vertical axes 25 so as to be closable on the container at the level of the lateral eyes 20 of the corner blocks 18. Each jaw has an inwardly directed tooth 26 at its free end, and it may be recognized in FIGS. 5 and 6 that, when the jaws close, the teeth 26 engage into the respective lateral eyes 20 so that the container may be pushed and pulled lengthwise by the carriage. Also, advantageously, the bolts 23 are displaceable in their longitudinal vertical planes for the purpose of lifting and lowering the container C within a relatively restricted range, e.g. of 15-20 cm. The displacement may be translational or angular. In FIGS. 5 and 6 each pair of bolts 23 is keyed at rear end on a horizontal transverse shaft 27 swingable by a convenient actuator, e.g. a hydraulic motor. The dashed rectangle 28 in FIG. 6 generically denotes an electro-hydraulic system incorporated into the carriage and comprising a hydraulic liquid tank, pumps, electric motors, solenoid valves and other components necessary for a timely actuation of the bolts 23 and jaws 24. The pivotal axes 25 of the jaws 24 may be swingable about horizontal transverse axes in the manner indicated by arrows in FIG. 5, under the control of the shafts 27, so that the teeth 26 may vertically follow the displacements of the bolts 23. To this end, the simplest way is to pivot the jaws 24 directly to the shafts 27.

Turning now to the cell structure, FIG. 3 shows that the girders 4 (hereinafter termed "rails" because of the function in this invention) are sloping towards the passageway at an angle X corresponding to the aforeindicated slope of 2-4%. Fixedly protruding upwardly at the lower end of each rail 4 is a box-like support 30 of inverted-U cross-sectional shape, as may be better seen in FIG. 10. The pair of rails 4 in each cell is bridged by a wheeled trolly 31, FIG. 10, essentially consisting of a robust transverse metal plank 32 having its end regions fixed to bogies 33 rolling on the respective rails. The plank 32 constitutes a support surface for an end of a container, the width A of this surface in rolling direction of the trolly being equal to, or preferably somewhat less than the longitudinal dimension A' (FIG. 3) of a corner block 18, the latter dimension being generally about 20 cm. The height of each bogie 33 is somewhat more (by, say, 2-3 cm) than that of the support box 30 so that, with the structure shown by FIG. 10, when the trolly 31 is in its lowermost position on the rails 4, the bogies 33 enter into the support boxes and the plank 32 extends above the boxes as is indicated by dash-and-dot lines 32' in FIG. 10 and may be better seen in FIG. 11. Longitudinally extending steel listels 34 welded to the rolling surface of the rails 4 provide guides for the bogies 33 preventing the latter from derailing.

Advantageously, the trolly further comprises an abutment member 35 extending upwardly from the rear boundary of the plank 32 to provide an angle 36 (FIG. 11) receiving a lower front-edge of a container, as will be better seen hereinafter. In practice, the plank 32 and the abutment member 35 are integrally formed by a segment of rolled steel L-profile, the length of the segment being slightly less than the width (2438 mm) of a standard container. Preferably, two centering bosses 37 protrude upwardly from the plank 32 at locations corresponding to the bottom eyes 21 of the end pair of corner blocks 18, so that the bosses may engage into said eyes 21 in operation to prevent mutual lateral displacements of the container and trolly.

According to a further feature of this invention, the end region of the elevator platform 5 adjacent the warehouse (or each of the warehouses in the illustrated embodiment) comprises transfer means for delivering to the trolly 31 the lower front-edge region of a container supported by the platform as the container is pushed by the carriage 14 into a cell. In the embodiment shown in FIG. 11, the transfer means comprise, for each of the two front corner blocks 18, a pad 38 housed in the upper face of the platform 5 at a location corresponding to a rear portion of the corner block. The pad 38 constitutes the free upper end of a lever arm 39, the lower end of which is pivoted at 40 to the platform so that the pad may reciprocate towards and away of the clearance 6 along an upwardly arcuate path 41. The lever arm 39 is power-actuated by a hydraulic double-acting cylinder 42 pivoted to the platform 5. Thus, during its delivery stroke, the pad 38 lifts its superposed end region of the container C and delivers this region to the angle 36 of the trolly 31. In this transfer stroke, and also in a reverse transfer stroke in unloading the container from a cell, the pad 38 engages the corner block 18 so that the lifting effort is concentrated on the block rather than on other zone of the container structure.

Figure 4:
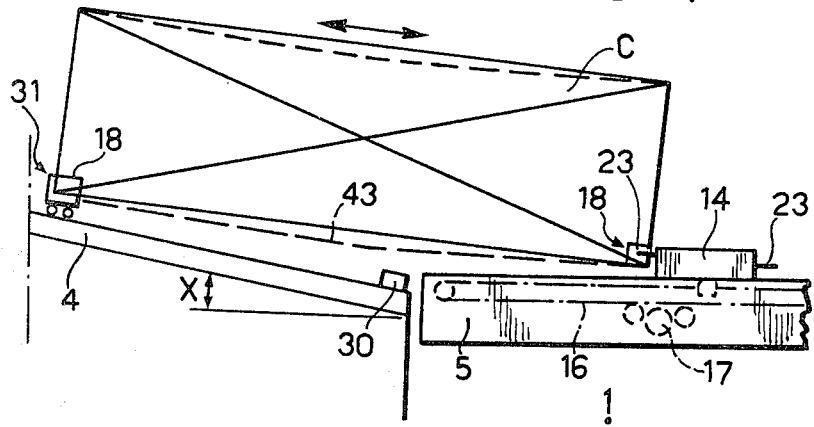
FIG. 4 is a schematic lateral view showing a container in an intermediate stage during its loading into a cell or unloading from a cell.

For merely illustrative purposes, the dashed line 43 in FIG. 4 denotes the downwardly bowed form taken by a container C when supported by the corner blocks.

The disclosed installation operates as follows.

Figure 11:
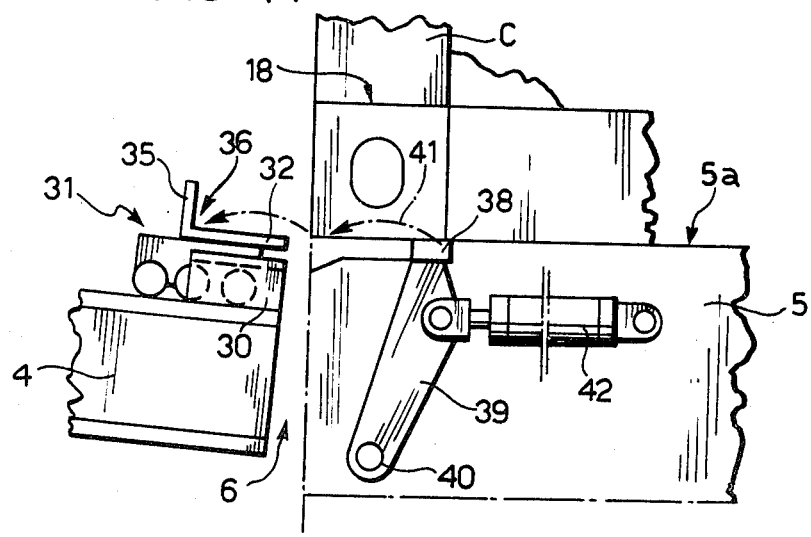
FIG. 11 is a lateral view illustrating the transfer of the leading end of a container from the platform onto the trolly in a cell.

Referring to the left-hand container C1 in FIG. 1, the carriage 14 engages this container by means of respective bolts and jaws and pulls it onto the platform 5 until the container reaches the position shown in FIG. 11 in which the front face of the container is flush with the end face of the platform. The platform is then shifted by the crane 7 and winches 9 to reach a selected cell 3 in the left-hand warehouse of FIG. 1. The platform is arrested with its upper face 5a located at least substantially at the level of the upper face of the plank 32 of the trolly 31 (FIG. 11). To safely secure and maintain this alignement each of the two end sections of the platform is equipped with a pair of longitudinally directed, retractable locking bolts 45 (FIGS. 8 and 9), capable of engaging in corresponding apertures 46 in the framework members of the warehouse. Then, the carriage 14 lifts its adjacent end of the container (FIG. 7) and pushes the latter towards the cell while at the same time the transfer means of FIG. 11 are actuated to lift their adjacent end of the container and to deliver the same to the trolly 31, as described hereinbefore. The carriage 14 continues to push the container, so that the latter entrains the trolly 31 to climb along the rails 4. In this manner the bottom of the container is prevented from creeping on any underlying parts of the installation (FIG. 4) and the forward movement of the carriage 14 is continued until its adjacent corner blocks 18 of the container are vertically above the respective support boxes 30 (FIG. 8). At this point the bolts 23 are lowered to deposit the said corner blocks onto their support boxes, whereupon the carriage 14 and the lock bolts 45 are withdrawn to freed the elevator platform for a next service. The container loaded into the cell remains supported by the trolly at one end and by the support boxes at the other end.

On emptying a cell the procedure is inverse to that described above.

We claim:

1. In a container storage installation comprising: a warehouse having a plurality of elongated, container-receiving cells arranged in an array of rows and columns, a servicing passageway common to said cells and into which each cell opens by one end, and a container loading- and unloading unit displaceable horizontally and vertically in the said passageway for loading and unloading a container lengthwise into and from a selected cell, each cell having floor members supporting a container in the cell, and wherein the container comprises a standard corner block at each of its four lower corners, the improvement wherein:

the said floor members in each cell comprise a pair of transversely spaced guide rails extending longitudinally of the cell throughout substantially the whole length of the latter, and a trolly bridging the rails and having a container-supporting upper surface providing a support for a restricted lower front-edge region only of the container substantially corresponding to the lower corner blocks at that end, said trolly being freely rollable on the rails under a thrust applied thereto by a container during loading and unloading into and from the cell;

the rails in each cell are sloping towards the passageway whereby, as the leading end of a container being pushed into a cell takes its support on the trolly, the latter is entrained by the container to climb along the rails thereby to gradually lift the said leading end of the container;

the said loading- and unloading unit comprises a horizontally elongated elevator platform capable of supporting a container on its upper face, and a carriage displaceable on said face from one end to the other end of the platform, said carriage having thereon first means for gripping a container on the platform by an end pair of the corner blocks at the lower rear-edge region of the container to push and pull the container lengthwise thereof for respectively loading and unloading a cell and second means engageable with said end pair of blocks at the lower rear-edge region of said container to raise and lower said rear-edge region relative to said carriage to assist in the transfer of said container; and wherein the end section of the platform adjacent the warehouse comprises transfer means for delivering to the trolly the said lower front-edge region of a container supported by the platform as the container is pushed by the carriage, said transfer means comprising a power-actuated pad in the upper face of the platform arranged to reciprocate longitudinally of the platform while lifting the said end region of the container by engagement with a corner block in said region.

2. The improvement of claim 1, wherein the slope of the rails is from 2 to 4%.

3. The improvement of claim 1, wherein the second means on the carriage capable of engaging the container comprises a pair of bolts protruding longitudinally from a front face of the carriage for engagement into the front eyes in corresponding end corner blocks of the container.

4. The improvement of claim 3, wherein the bolts are powered for displacement in their respective vertical planes thereby to provide means capable of lifting with respect to the platform the container end in which the bolts are engaged.

5. The improvement of claim 1, wherein the said first means comprises a pair of lateral jaws closable on the said corner blocks to embrace therebetween the respective end of the container, each of the jaws comprising a tooth engaging into the lateral eye of the respective corner block on closure of the jaw whereby the carriage may push and pull the container.

6. The improvement of claim 1, wherein the trolly further comprises an abutment member extending upwardly from the rear boundary of the container-supporting surface to provide an angle receiving a lower front-edge of the container.

7. The improvement of claim 1, wherein the the lower corner blocks of a container in a cell at the end opposite the trolly-supported end are individually supported each by a support box fixedly extending upwardly from the end section of the respective rail proximal to the passageway.

* * * * *